United States Patent [19]

Minozzi, Jr.

[11] 4,285,135
[45] Aug. 25, 1981

[54] PANEL CUTTING GUIDE

[76] Inventor: Michael F. Minozzi, Jr., 10 Mein Dr., New City, N.Y. 10956

[21] Appl. No.: 66,165

[22] Filed: Aug. 13, 1979

[51] Int. Cl.³ .............................. B27C 1/00; G01B 3/00
[52] U.S. Cl. ........................................ 33/189; 33/197; 33/DIG. 10
[58] Field of Search ................. 33/189, 191, DIG. 10, 33/174 G, 197, 194, 456

[56] References Cited

U.S. PATENT DOCUMENTS

| | | | |
|---|---|---|---|
| 893,562 | 7/1908 | Ash | 33/189 |
| 2,821,027 | 1/1958 | Billhimer, Sr. | 33/456 X |
| 3,950,857 | 4/1976 | Zanavich | 33/DIG. 10 |
| 4,058,902 | 11/1977 | Hall | 33/189 |

Primary Examiner—William D. Martin, Jr.
Attorney, Agent, or Firm—Pasquale A. Razzano

[57] ABSTRACT

The panel cutting guide includes a primary elongated measuring rod and a pair of secondary measuring arms releasably secured thereto in spaced parallel relationship. A pair of marker elements are slidably mounted on each of the secondary measuring arms, on opposite sides of the primary measuring arm, with each marker element including a releasable locking member for securing the marker in any of a plurality of positions on its associated secondary measuring arm. The adjustability of the secondary measuring arms and the marker elements thereon enable the operator to position the marker elements at the perimeter of a wall opening, such as an electric receptacle box. With the marker elements in position, the panel cutting guide can be placed on a panel to be cut, so that the marker elements will locate the opening to be cut in the panel in order to accommodate the wall opening.

17 Claims, 10 Drawing Figures

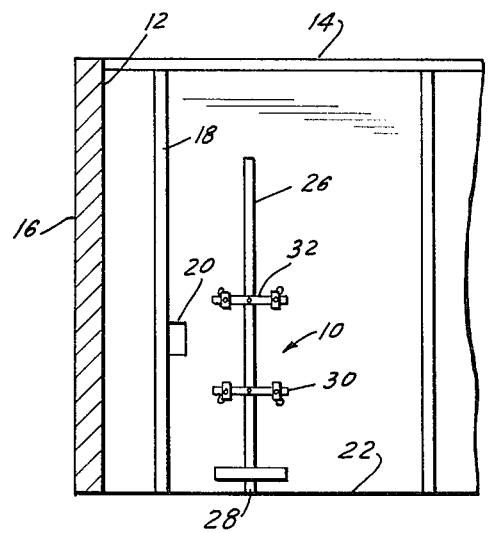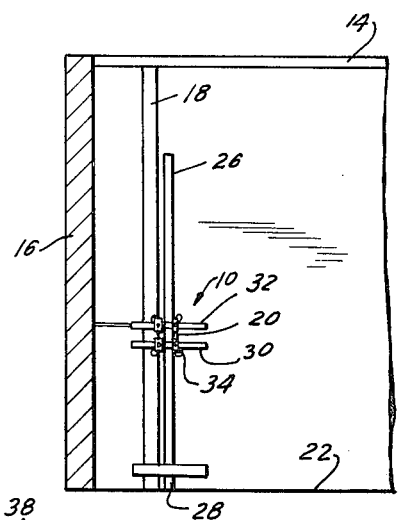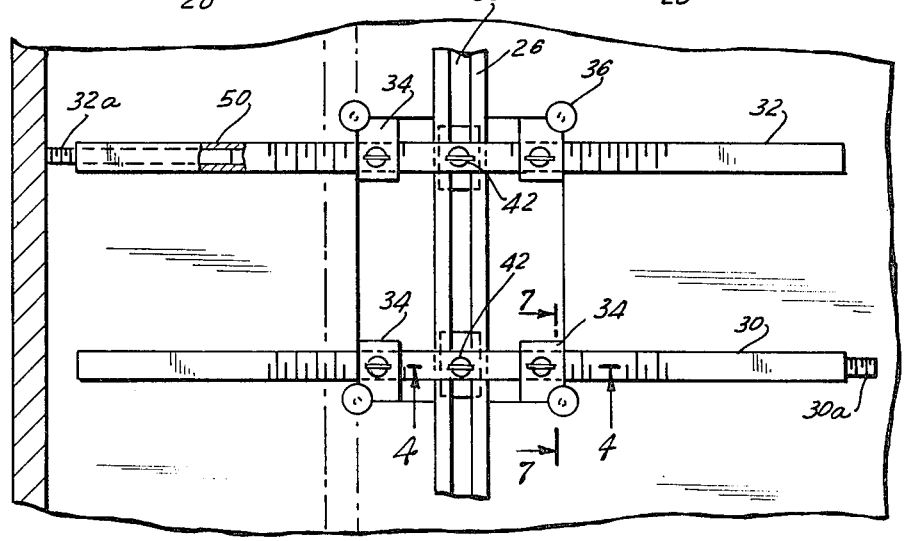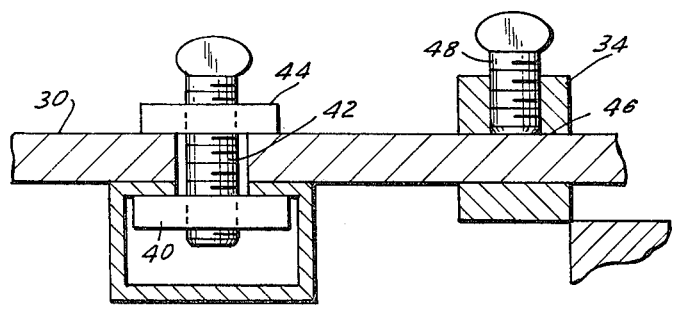

PANEL CUTTING GUIDE

The present invention relates to cutting guides and, in particular, to a guide for locating openings to be cut in wall panels.

One of the most difficult tasks in placing wall panels, such as sheet rock walls or wooden paneling, on the walls of a building is to properly locate openings to be cut in the panels to permit access to electrical receptacles, switches, air registers and other similar openings. Typically such measurements are taken by the use of an extensible rule, with multiple measurements being taken from the floor and side wall. This is a time consuming and difficult task, particularly for the home craftsman. If the aperture to be cut is not properly located an entire panel can be destroyed. Since paneling, particularly wood paneling, is relatively expensive, it is highly desirable to provide an accurate cutting guide to enable a craftsman to properly locate apertures to be cut therein.

A number of guide elements have been previously proposed for this purpose. Such elements are shown for example in U.S. Pat. Nos. 3,672,064; 4,059,907; 3,842,510 and 3,522,658. Each of these devices is relatively complicated to use and provides little or no adaptability in aperture dimensions. That is, they are intended to measure openings of only a single standard dimension, such as for example an electrical outlet box.

In accordance with the present invention a panel cutting guide is provided which will accurately locate openings to be cut in the panel, regardless of the size of the opening. The device includes adjustable marker elements which can be positioned to conform to the size of the opening to be cut in the panel.

It is an object of the present invention to provide a panel cutting guide which has a plurality of adjustments, enabling it to be used to measure a variety of different sized openings.

Another object of the present invention is to provide a panel cutting guide which is relatively simple in construction and use.

A still further object of the present invention is to provide a panel cutting guide which will provide accurate measurements for cutting openings in wall panels.

The above, and other objects, features and advantages of this invention will be apparent in the following detailed description of an illustrative embodiment thereof, which is to be read in connection with the accompanying drawings, wherein:

FIG. 1 is an elevational view of a portion of a wall which is to be paneled, showing the cutting guide device of the present invention against the wall and an electrical outlet box for which an opening must be cut in the panel placed on the wall;

FIG. 2 is an elevational view similar to FIG. 1 showing the panel cutting guide of the present invention positioned to locate the electrical outlet box opening;

FIG. 3 is a plan view of a portion of the panel cutting guide of the present invention, shown against the electrical outlet box to be located;

FIG. 4 is a sectional view taken along line 4—4 of FIG. 3;

Figure 5:
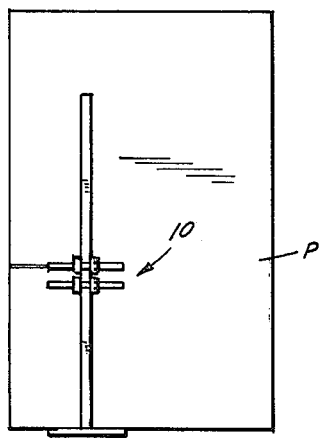
FIG. 5 is a plan view showing the panel cutting guide of the present invention positioned over a panel in which the opening is to be cut.

Referring now to the drawings in detail, and initially to FIG. 1 thereof, a panel cutting guide 10 is illustrated adjacent the corner 12 of a room to be paneled. In the illustration the room includes a first wall 14 and a second wall 16 extending perpendicularly thereto. The wall 14 is studded, as shown, and one of the studs 18 has an electrical receptacle 20 mounted thereon in the conventional manner. The panel cutting guide 10 is provided to enable the operator to simultaneously measure the dimensions of the receptacle box 20, its distance from the floor 22 and its distance from the corner 12, so that a panel to be placed on the studs of the wall 14 can be marked to enable an opening to be cut therein corresponding in location to the actual location of receptacle box 20.

Panel cutting guide 10 includes a first measuring rod 26, which may be marked with measuring indicia starting from 0 at its foot 28 and progressing upwardly. A pair of secondary measuring rods or arms 30, 32 are adjustably mounted for vertical movement in relatively parallel positions along rod 26.

Pairs of marker elements 34 are adjustably mounted on arms 30, 32 on opposite sides of rod 26. Preferably, as described hereinafter, secondary arms 30, 32, as well as the primary rod 26, are telescopic members, each of which may be marked with measuring indicia.

In use, as seen in FIG. 2, panel cutting guide 10 is positioned adjacent receptacle box 20 with its foot 28 on floor 22. Secondary arms 30, 32 are then adjusted along the length of rod 26 so that the outer peripheral sides of marker elements 34 generally align with the periphery of the receptacle box or other element for which an opening is to be cut in a panel. The telescopic elements of one of the arms 30, 32 is then extended to the nearest adjacent corner (or an adjacent panel edge if a prior panel has already been placed on the wall) to provide a horizontal measurement from the edge of the panel to be cut to the receptacle box. With the panel cutting guide in this configuration, the guide can be placed over a panel to be cut, aligning the foot of rod 28 with the bottom edge of the panel and the end of the telescopic rod 32 with the side edge of the panel, so that marker elements 34 are located on the panel at the location of the cut to be made therein. The operator can then physically mark the corners of the opening by using the outer edges of the marker elements as a guide, in order to locate the cut lines to be made on the panel.

Preferably the marker elements 34 each include a device 36 for making a physical mark on the panel at each corner of the opening to be cut, and these marks can then be used to guide a scribe or rule used by the operator to draw the outline of the cut on the panel.

More specifically, as seen in FIGS. 3 and 4, primary measuring rod 26 is a generally channel shaped member having an outwardly opening slot 38 formed therein. A pair of lock nuts 40 of generally polygonal configuration, are captured in the channel of rod 26 and are slidable therein. The secondary measuring arms 30, 32 are secured to primary rod 26 by thumb screws 42 each of which extends through their associated secondary rod, as seen in FIG. 3, into threaded engagement with nuts 40 and a lock nut 44. By loosening screws 42, the relative positions of secondary measuring arms 30, 32 can be adjusted along the length of primary rod 26. On the other hand, by tightening screws 42, nuts 40, 44 are drawn towards each other and rods 30, 32 are locked in position on rod 26.

Marker elements 34 are generally rectangular members having slots 46 formed therein which slidably receive secondary arms 30, 32, as seen in FIG. 3. These marker elements are adjustably positioned along the secondary measuring arms by the use of set screws 48 or the like. Thus, by loosening the set screws the marker elements can be moved along the length of their associated secondary measuring arms, while tightening the thumb screws 48 will secure the marker elements in position.

As mentioned, secondary measuring arms 30, 32 may be telescopic members. The specific construction of these telescopic members can take any desired configuration. In the illustrative embodiment, at least one end of each of the measuring arms 30, 32 is hollow and a telescopic measuring element 30a, 32a is slidably received therein. These measuring elements may be provided with conventional spring biased ball detents 50, which will snap in recesses formed on the inner surfaces of the hollow ends of these secondary measuring arms.

With this arrangement, as described above, the foot 28 of primary measuring rod 26 can be placed on floor 22, and the measuring arms 30, 32 adjusted so that the peripheral upper edges of the marker elements on arm 32 and the lower edges of the marker elements on arm 30 align with the upper and lower edges 20a and 20b of the electrical outlet receptacle 20. Similarly, the marker elements themselves can be adjusted laterally along their associated secondary measuring arms so that their outer side edges align with the side edges of the receptacle. In this manner, the outer edges of the marker elements are congruent to the corners of the receptacle box and provide a guide for locating the box. By extending one of the secondary measuring arms to the corner of the wall, as illustrated in FIG. 3, the panel cutting guide gives an automatic measurement of the distance from the corner of the wall and the vertical distance from the box from the floor.

As thus far described, the receptacle to be accommodated is located at the corner of a room in the first panel to be cut. However, it will be appreciated that if the receptacle box or other opening is located in a panel to be cut further from the corner, the lateral measurement is taken to the edge of the adjacent, previously placed panel, since it is that edge against which the edge of the cut panel shall be placed.

With the marker elements and secondary measuring arms located in this position the panel cutting guide is placed over a panel with the foot end 28 of the primary measuring rod 26 aligned with the bottom edge of the panel and the edge of the extended secondary arm aligned with the side edge of the panel to abut against the wall. Using the outer edges of the marker elements as a guide, the user can then mark the panel with a pencil to locate the corners of the opening to be cut in the panel. These guidelines drawn by the user can then be used to align a rule to complete the outline of the box of the opening to be cut.

Figure 6:
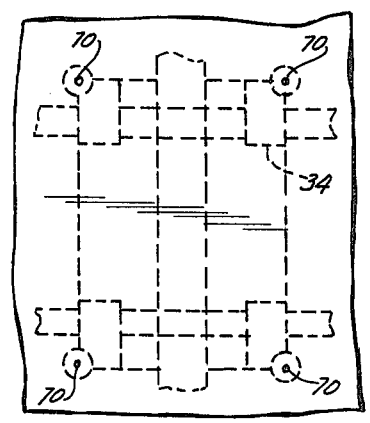
FIG. 6 is a partial plan view of the marked portion of the panel.
Figure 7:
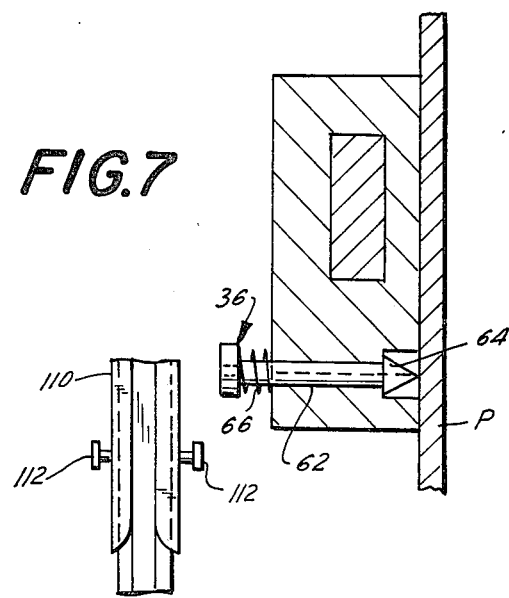
FIG. 7 is a sectional view taken along line 7—7 of FIG. 3.

In accordance with another aspect of the present invention, each marker element can be provided with a marker device 36, shown in FIG. 7. This device includes a pin 62, having a pointed end 64, slidably mounted in the marker element 34 at the outer most corner of each element, as seen in FIG. 3. The marker element may be biased by a spring 66 into a retracted position so that the pointed end 64 is normally located in a recess 67 in the marker element. When the panel cutting guide is positioned over the panel to be cut, as previously described, the operator then need only depress pin 62 against the bias of spring 66 in order to press the tip of the pin into the panel and form a mark therein. These points then correspond to the corners of the opening to be cut. Thus, as shown in FIG. 6, the operator provides four guide points 70 on the panel to be cut and can use these guide points to draw the outlines of the opening on the panel before the cut is made. In FIG. 6, the marker elements 34 are shown in dotted lines, to aid in understanding how points 70 are positioned.

To aid in aligning foot 28 of primary cutting rod 26 against the bottom edge of the panel, a guide foot 80 is provided. This guide foot is a generally T-shaped member including a pair of L-shaped side bars 82 having legs 84 extending perpendicular to rod 26 and to which a guide block 86 is secured by screws 88 or the like. Side bars 82 are pivotally secured to rod 26 by a butterfly bolt and nut assembly 90, in any convenient manner, so that the guide foot can be removed from the device if desired. The guide foot is mounted on the rod so that, in the solid line position shown in FIG. 9, the upper surface 92 of cross piece 86 aligns with the extreme end of foot 28, to define the zero point of the rod.

Figure 9:
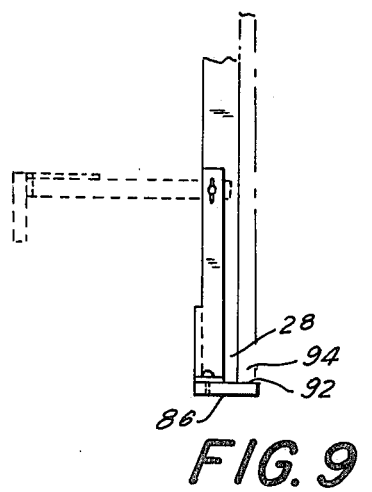
FIG. 9 is a side view taken along line 9—9 of FIG. 8.

In use, foot 80 is raised when the measurement is taken against the floor, as previously described; but when panel cutting guide 10 is placed on the panel, as illustrated in FIG. 5, foot 80 is lowered, into the solid line position of FIG. 9, so that edge 94 of the panel will abut against the surface 92 of the foot. This accurately and firmly locates the zero point of the foot of rod 26 in alignment with the bottom edge of the panel to insure that the opening to be cut is accurately located. The operator need then only align the end of the extended secondary arm (32a) in the illustrated embodiment to accurately locate the opening to be cut in the panel.

Figure 10:
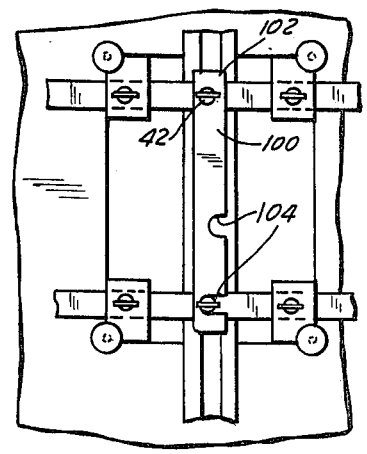
FIG. 10 is a plan view similar to FIG. 3, showing the use of a standard measuring guide link in conjunction with the panel cutting guide of the present invention.
Figure 8:
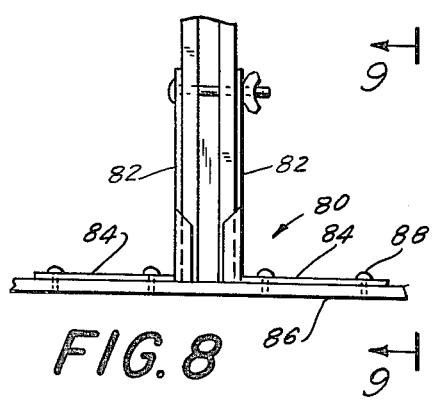
FIG. 8 is an enlarged view of the bottom end of the panel guide of the present invention.

When a plurality of openings are to be cut in a number of wall panels for a standard fixture, such as an electrical box, a guide link 100 (see FIG. 10) may be provided on the device to reduce the number of manipulations needed in order to measure the location of the box in each panel. This guide link has one end 102 pivotally mounted on one of the thumb screws 42 for one of the secondary measuring arms. One edge of the link includes one or more openings 104 whose distance from the pivot opening for the thumb screw at end 102 is a standard dimension selected such that when the slot or recess 104 is engaged against the other thumb screw 42, the upper and lower edges of marker elements 34 are spaced to align with the upper and lower edges of a standard electrical box. With the use of this link, as illustrated in FIG. 10, the secondary cutting arms can be linked together in a standard spaced relationship, and thus only one of the thumb screws 42 need be loosened and tightened to lock the assembly in place. That is, one of the thumb screws 42 can be kept loose, while the other thumb screw can be loosened to permit the user to slide both secondary measuring arms simultaneously along rod 26, while maintaining the desired space parallel relationship of the secondary measuring arms. Then, when the upper and lower edges of marker elements are aligned with the upper and lower edges of the receptacle box, the one thumb screw 42 is tightened to lock the arms in place. Thereafter, it is only necessary to adjust the lateral position of the marker elements 34.

If desired, rod 26 may also be made as a telescopic member. In the illustrative embodiment this is achieved by the use of a channel shaped extension 110 slidably received on rod 26 and having a pair of set screws 112 mounted therein for engaging the sides of rod 26 and locking the extension adjustably in place on the rod.

Accordingly, it is seen that a relatively simple device is provided which will permit the user to measure a large number of different sized openings, rapidly and conveniently. The device is simple to use in providing vertical and horizontal measurements simultaneously, which measurements are readily transferred to the panel to be cut.

Although an illustrative embodiment of the present invention has been described here with reference to the accompanying drawings, it is to be understood that the invention is not limited to that precise embodiment, and that various changes and modifications may be effected therein by one skilled in the art without departing from the scope or spirit of this invention.

What is claimed is:

1. A panel cutting guide comprising, a primary elongated measuring rod; a pair of secondary measuring arms, means for releasably locking said secondary measuring arms on said primary measuring arm in any of a plurality of selected positions normal to said primary measuring arm; a pair of marker elements slidably mounted on said secondary measuring arms, on opposite sides of said primary measuring arm and means for releasably locking said marker elements in any of a plurality of selected positions on said secondary measuring arms; said marker elements being generally rectangular in plan, having straight side guide edges and selectively operable means for forming a mark on a panel; said means for forming a mark being located at one corner of said rectangular marker elements to form a mark at the intersection of two sides of said rectangular marker elements.

2. A panel cutting guide as defined in claim 1 including selectively positionable stop means mounted at one end of said primary measuring arm for engaging an edge of a panel to be cut.

3. A panel cutting guide as defined in claim 2 wherein said stop means is mounted to align with said one end of said primary measuring arm when positioned to engage an edge of a panel to be cut.

4. A panel cutting guide comprising, a primary elongated measuring rod; a pair of secondary measuring arms, means for releasably locking said secondary measuring arms on said primary measuring arm in any of a plurality of selected positions normal to said primary measuring arm; a pair of marker elements slidably mounted on said secondary measuring arms, on opposite sides of said primary measuring arm and means for releasably locking said marker elements in any of a plurality of selected positions on said secondary measuring arms; and selectively positionable stop means mounted at one end of said primary measuring arm for engaging an edge of a panel to be cut; said stop means being mounted to align with one end of said primary measuring arm when positioned to engage an edge of a panel to be cut; and said stop means being a flat element extending transversely of said primary measuring arm and pivotally mounted thereon for pivotal movement.

5. A panel cutting guide as defined in any one of claims 1 or 4 wherein said primary measuring arm is generally channel shaped in cross-section having oppositely directed spaced flanges facing each other to define an elongated longitudinally extending slot opening into the channel in said primary measuring arm.

6. A panel cutting guide as defined in claim 5 wherein said means for releasably locking said secondary measuring arms on said primary measuring arm comprises separate nuts in the channel of the primary measuring arm dimensioned to be slidable in the channel but held against rotation therein and a pair of screws respectively extending through said secondary measuring arms in engagement with said nuts.

7. A panel cutting guide as defined in any one of claims 1 or 4 wherein said means for releasably locking said marker elements on said secondary measuring arms comprises a plurality of set screws respectively threadably engaged with said marker elements and having free ends positioned to engage said secondary measuring arms.

8. A panel cutting guide as defined in any one of claims 1 or 4 including measuring indicia on said primary measuring arm having a zero point located at one end thereof.

9. A panel cutting guide as defined in any one of claims 1 or 4 wherein at least one of said secondary measuring arms is a telescopic member.

10. A panel cutting guide as defined in claim 8 including measuring indicia on at least one of said secondary measuring arms.

11. A panel cutting guide comprising, a primary elongated measuring rod; a pair of secondary measuring arms, means for releasably locking said secondary measuring arms on said primary measuring arm in any of a plurality of selected positions normal to said primary measuring arm; a pair of marker elements slidably mounted on said secondary measuring arms, on opposite sides of said primary measuring arm and means for releasably locking said marker elements in any of a plurality of selected positions on said secondary measuring arms; and an adapter link of predetermined length pivotally mounted on one of said secondary arms and having means for engaging the locking means of the other secondary arm to provide a standard spacing dimension therebetween.

12. A panel cutting guide comprising, a primary elongated measuring rod, a pair of parallely extending secondary measuring arms, means for releasably locking said secondary measuring arms on said primary measuring arms in any of a plurality of selected spaced parallel positions normal to said primary measuring arm; a pair of marker elements slidably mounted on each of said secondary measuring arms on opposite sides of said primary measuring arm; means for releasably locking said marker elements in any of a plurality of selected spaced positions on said secondary measuring arms; and selectively positionable stop means mounted on one end of said primary measuring arm for engaging the edge of a panel to be cut; said stop means being mounted to align with said one end of said primary measuring arm to define a zero measuring point when positioned to engage an edge of a panel to be cut; said stop means being a flat element extending transversely of said primary measuring arm and pivotally mounted thereon for pivotal movement.

13. A panel cutting guide as defined in claim 12 wherein said primary measuring arm includes a telescopic extension member.

14. A panel cutting guide as defined in claim 13 wherein at least one of said secondary measuring arms is telescopically extensible.

15. A panel cutting guide as defined in claim 12 wherein said marker elements are generally rectangular in plan and have straight side guide edges.

16. A panel cutting guide as defined in claim 15 wherein said marker elements include selectively operable means for forming a mark on a panel.

17. A panel cutting guide comprising, a primary elongated measuring rod, a pair of parallely extending secondary measuring arms, means for releasably locking said secondary measuring arms on said primary measuring arms in any of a plurality of selected spaced parallel positions normal to said primary measuring arm; a pair of marker elements slidably mounted on each of said secondary measuring arms on opposite sides of said primary measuring arm; means for releasably locking said marker elements in any of a plurality of selected spaced positions on said secondary measuring arms; and selectively positionable stop means mounted on one end of said primary measuring arm for engaging the edge of a panel to be cut; said stop means being mounted to align with said one end of said primary measuring arm to define a zero measuring point when positioned to engage an edge of a panel to be cut; and an adapter link of predetermined length pivotally mounted on one of said secondary arms and having means for engaging the locking means of the other secondary arm to provide a standard spacing dimension therebetween.

* * * * *